United States Patent
Borden et al.

(10) Patent No.: US 6,268,854 B1
(45) Date of Patent: Jul. 31, 2001

(54) PICTURE SEARCH DEVICE AND RECORDING MEDIUM READABLE FOR THE SAME

(75) Inventors: George Borden, Portland, OR (US); Naoki Urano, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/134,768

(22) Filed: Aug. 12, 1998

(30) Foreign Application Priority Data

Aug. 14, 1997 (JP) .................................................. 9-219642

(51) Int. Cl.[7] ........................................................ G06F 3/14
(52) U.S. Cl. .......................... 345/341; 345/339; 345/123; 345/127; 345/968; 707/104; 707/3; 707/4
(58) Field of Search .................................. 345/341, 339, 345/123, 127, 968; 707/104, 3, 4

(56) References Cited

U.S. PATENT DOCUMENTS

| | | | | |
|---|---|---|---|---|
| 5,179,652 | * | 1/1993 | Rozmanith et al. ................... | 345/331 |
| 5,220,648 | * | 6/1993 | Sato ......................................... | 707/3 |
| 5,421,008 | * | 5/1995 | Banning et al. ........................ | 707/4 |
| 5,452,413 | * | 9/1995 | Blades .................................... | 395/349 |
| 5,517,605 | * | 5/1996 | Wolf ....................................... | 707/104 |
| 5,553,225 | * | 9/1996 | Perry ...................................... | 395/341 |
| 5,579,471 | * | 11/1996 | Barber et al. .......................... | 345/326 |
| 5,751,829 | * | 5/1998 | Ringland et al. ...................... | 382/100 |
| 5,761,655 | * | 6/1998 | Hoffman ................................ | 707/4 |
| 5,903,267 | * | 5/1999 | Fisher .................................... | 345/341 |
| 5,973,663 | * | 10/1999 | Bates et al. ............................ | 345/123 |

OTHER PUBLICATIONS

"Instructions for Use of Personal Computer Connection Kit (for Windows), Model AD–PS1PK", Sharp, Picture Works PhotoEnhancer v 3.1(3.4), © 1994–1997, PictureWorks Technology, Inc., pp. 37–41 and partial translation.

* cited by examiner

Primary Examiner—Raymond J. Bayerl
Assistant Examiner—Thomas T. Nguyen
(74) Attorney, Agent, or Firm—Nixon & Vanderhye P.C.

(57) ABSTRACT

A picture search device of the present invention includes: a storage section; a display section; a position input section; and a control section for controlling the storage section, the display section and the position input section. The storage section contains a plurality of pictures respectively provided with labels which are assigned in accordance with a predetermined rule. The position input section detects input information from a user so as to provide a control signal to the control section in response to the input information. The control section displays a scroll bar including a slider in a predetermined area in the display section, determines a position along the scroll bar at which the slider is to be displayed based on the control signal, displays the slider at the position in the display section, determines one of the plurality of labels corresponding to the position as a first label, identifies one of the pictures having the first label as a user-focused picture, identifies one of the pictures having a second label, different from the first label, as a reference picture, displays the reference picture in the display section, and displays the user-focused picture in a display mode different from a display mode of the reference picture.

21 Claims, 10 Drawing Sheets

PICTURE SEARCH DEVICE AND RECORDING MEDIUM READABLE FOR THE SAME

BACKGROUND OF THE INVENTION

1. Field of the Invention

The present invention relates to a picture search device and a recording medium readable for such a picture search device. More particularly, the present invention relates to a picture search device for allowing the user to easily find a picture of interest from a plurality of stored pictures and a recording medium readable for such a picture search device.

2. Description of the Related Art

Many commercially-available conventional picture search applications display a scroll bar in a display window, along which a slider can be moved so that a picture corresponding to the position of the slider is displayed.

However, there is no conventional picture search application which emphasizes a picture in the display window which is currently being focused on by the user (hereinafter, referred to simply as the "user-focused picture"). Therefore, there is inconvenience for the user in finding a picture of interest out of a plurality of pictures displayed in the display window.

In the conventional picture search applications, the position of the slider along the scroll bar is used to determine which one(s) of the plurality of pictures is to be displayed. In many of the conventional applications, since the scroll bar and the slider each have a fixed length, it is typically necessary to move the slider quickly in order to have a large interval of stored pictures between two displayed pictures or slowly in order to have a small interval therebetween (hereinafter, such an interval is referred to also as the "display interval"). Such manual adjustment of the display interval is not convenient. Although some of the conventional applications allow the user to adjust the display interval, it is also troublesome for the user to input a value each time the user wishes to change the display interval.

Thus, it is desired to provide a picture search device which displays pictures in such a manner that the user can visually and easily select the picture of interest.

It is also desired to provide a picture search device which displays reference pictures from which a picture of interest is selected by the user, where the user can freely and easily set a reference picture interval which represents an interval between two displayed reference pictures.

SUMMARY OF THE INVENTION

According to one aspect of this invention, a picture search device includes: a storage section; a display section; a position input section; and a control section for controlling the storage section, the display section and the position input section. The storage section contains a plurality of pictures respectively provided with labels which are assigned in accordance with a predetermined rule. The position input section detects input information from a user so as to provide a control signal to the control section in response to the input information. The control section displays a scroll bar including a slider in a predetermined area in the display section, determines a position along the scroll bar at which the slider is to be displayed based on the control signal, displays the slider at the position in the display section, determines one of the plurality of labels corresponding to the position as a first label, identifies one of the pictures having the first label as a user-focused picture, identifies one of the pictures having a second label, different from the first label, as a reference picture, displays the reference picture in the display section, and displays the user-focused picture in a display mode different from a display mode of the reference picture.

In one embodiment of the invention, the control section further determines a size of the slider based on the control signal from the position input section, displays the slider at the position in the display section according to the size, and determines the second label based on the size.

In one embodiment of the invention, the control section further determines a size of the slider based on the control signal from the position input section, displays the slider at the position in the display section according to the size, and determines the second label based on the size of the slider. The control section further determines a third label, different from the second label, based on the size of the slider, identifies one of the pictures having the third label as a second reference picture, and displays the second reference picture in the display section.

In one embodiment of the invention, the reference picture and the second reference picture are displayed along an edge of the display section, with a copy of the user-focused picture displayed between the reference picture and the second reference picture in a same display mode as that for the reference picture.

In one embodiment of the invention, the control section identifies one of the pictures having a fourth label as a third reference picture and one of the pictures having a fifth label as a fourth reference picture, so as to further display the third and fourth reference pictures in the display section. The fourth label is assigned between the first and second labels, while the fifth label is assigned between the first and third labels.

In one embodiment of the invention, the predetermined rule for assigning the labels is a function of time.

In one embodiment of the invention, the predetermined rule for assigning the labels is a spatial function.

In one embodiment of the invention, the mode for displaying the user-focused picture which is different from that for the reference picture includes displaying the user-focused picture in a larger display area than that for the reference picture.

According to another aspect of this invention, a picture search device includes: a storage section; a display section; and a control section for controlling the storage section and the display section. The storage section contains a plurality of pictures respectively provided with labels which are assigned in accordance with a predetermined rule, the pictures having respective values. The control section determines the value of the picture displayed in the display section in accordance with a predetermined function, and provides a preferential order to each of the plurality of pictures stored in the storage section based on the determined value.

In one embodiment of the invention, the predetermined function for determining the value includes a function where the value is increased in accordance with at least one of a time period for which the picture has been displayed in the display section and a number of times the picture has been displayed in the display section.

In one embodiment of the invention, the display section has a user-focused picture display area, and the predetermined function for determining the value includes a function where the value is increased in accordance with at least one of a time period for which the picture has been displayed in the user-focused picture display area and a number of times the picture has been displayed in the user-focused picture display area.

In one embodiment of the invention, when a display time period for which the picture has been displayed in a single time exceeds a predetermined upper limit value, the display time period is considered to be the upper limit value.

In one embodiment of the invention, the predetermined function for determining the value includes a function where the value is changed in accordance with a display area of the picture.

In one embodiment of the invention, the preferential order of the picture is determined using a standard deviation of a frequency distribution for the values of the pictures.

In one embodiment of the invention, one of the pictures whose preferential order is greater than or equal to a predetermined value is stored in a predetermined storage location.

According to still another aspect of this invention, a recording medium storing a program and readable for a picture search device is provided. Such a device includes: a storage section; a display section; a position input section; and a control section for controlling the storage section, the display section and the position input section, the storage section containing a plurality of pictures respectively provided with labels which are assigned in accordance with a predetermined rule, and the position input section detecting input information from a user so as to provide a control signal to the control section in response to the input information. The program includes the steps of: displaying a scroll bar including a slider in a predetermined area in the display section; determining a position along the scroll bar at which the slider is to be displayed based on the control signal; displaying the slider at the position in the display section; determining one of the plurality of labels corresponding to the position as a first label; identifying one of the pictures having the first label as a user-focused picture; identifying one of the pictures having a second label, different from the first label, as a reference picture; displaying the reference picture in the display section; and displaying the user-focused picture in a display mode different from a display mode of the reference picture.

In still another aspect of this invention, a recording medium storing a program and readable for a picture search device is provided. Such a device includes: a storage section; a display section; and a control section for controlling the storage section and the display section, the storage section containing. a plurality of pictures respectively provided with labels which are assigned in accordance with a predetermined rule, and the pictures having respective values. The program includes the steps of: determining the value of the picture displayed in the display section in accordance with a predetermined function; and providing a preferential order to each of the plurality of pictures stored in the storage section based on the determined value.

Thus, the invention described herein makes possible the advantages of: (1) providing a picture search device which displays pictures in such a manner that the user can visually and easily select a picture of interest; and (2) providing a picture search device which displays reference pictures from which a picture of interest is selected by the user, where the user can freely and easily set a reference picture interval.

These and other advantages of the present invention will become apparent to those skilled in the art upon reading and understanding the following detailed description with reference to the accompanying figures.

DESCRIPTION OF THE PREFERRED EMBODIMENTS

Figure 13:
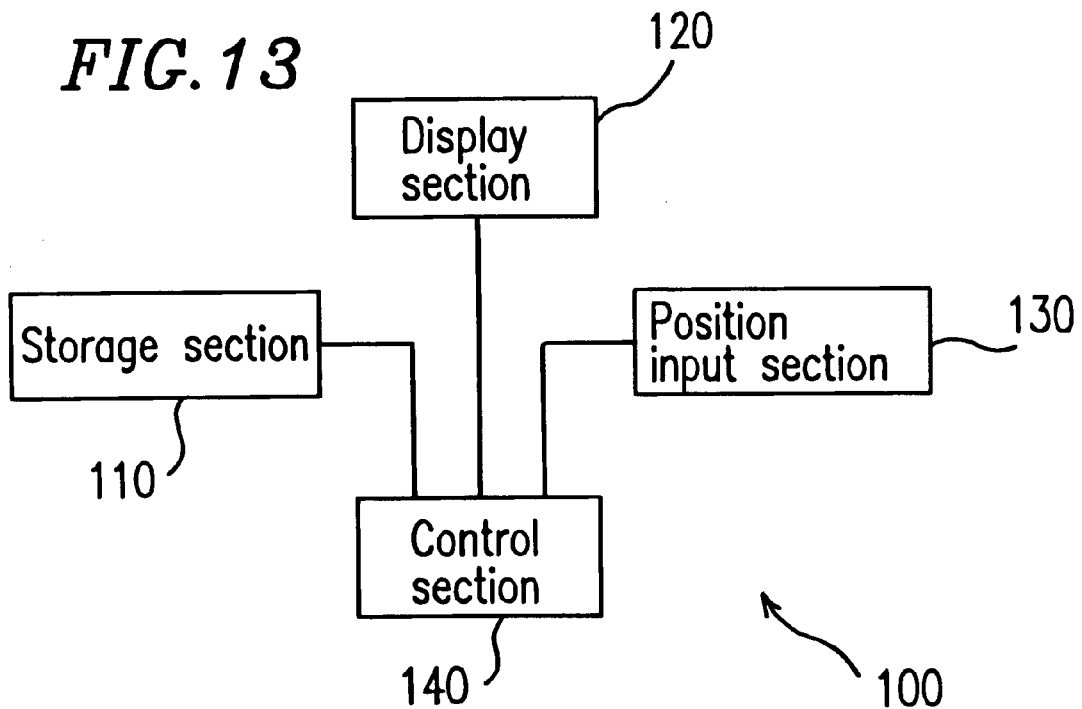
FIG. 13 is a schematic diagram illustrating a hardware configuration of a picture search device of the present invention.

FIG. 13 illustrates a hardware configuration of a picture search device 100 of the present invention. The picture search device 100 includes a storage section 110, a display section 120, a position input section 130 and a control section 140. The storage section 110, the display section 120 and the position input section 130 are respectively connected to the control section 140.

The storage section 110 contains a plurality of pictures respectively provided with labels which are assigned in accordance with a predetermined rule. Preferably, the labels are numerals. More preferably, the initial label is "0". Still more preferably, the labels are all natural numbers. The labels can be assigned in accordance with a time function or a spatial function. The term "time function" as used herein may be, for example, a function which increases with time. The term "spatial function" as used herein refers to a function whose domain represents a position. In a three-dimensional space, for example, the spatial function may be represented as $f(x,y,z)$. The set of coordinates $(x,y,z)$ represents a position in a three-dimensional space $R^3$. The spatial function can be, for example, a function for assigning index numbers according to a geographical map. Moreover, the label does not have to be a numeral but may also be a character string composed of one or more Roman characters, for example.

The display section 120 displays a picture based on an instruction from the control section 140.

The position input section 130 detects input information from the user, and provides a control signal to the control section 140 in accordance with the input information. The position input section 130 is typically a mouse, but may also be other input devices including, for example, a pen type input device and a keyboard.

The control section 140 performs a control function which includes reading out a picture stored in the storage section 110, receiving a control signal from the position input section 130, and performing a control for displaying a display window in the display section 120.

EXAMPLE 1

Figure 1:
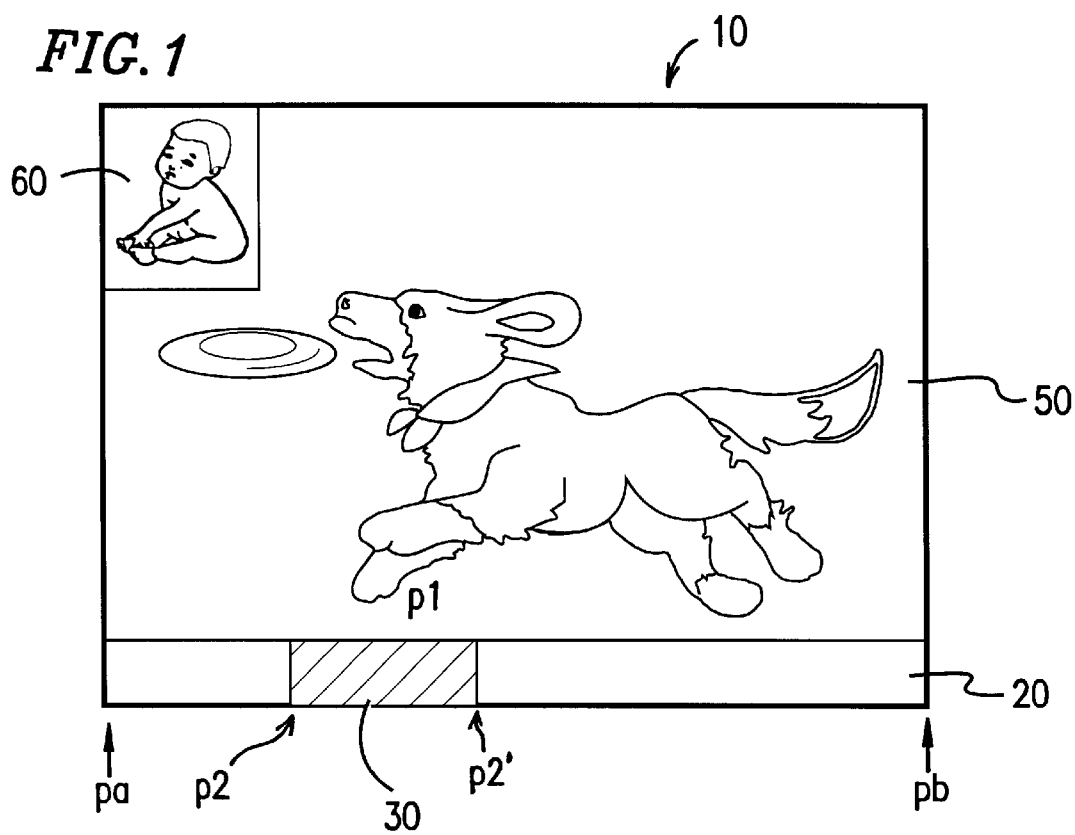
FIG. 1 is a schematic diagram illustrating a display window according to Example 1 of the present invention.

FIG. 1 illustrates a display window 10 displayed in the display section 120 according to Example 1 of the present invention.

Referring to FIG. 1, a scroll bar 20 extends along the lower edge of the display window 10.

A slider 30 is provided on the scroll bar 20. Positions p1, p2 and p2' correspond to the middle position, the left end and the right end of the slider 30, respectively. The slider 30 can be freely moved along the scroll bar 20 in accordance with the user's input.

The positions pa and pb correspond to the left end and the right end of the scroll bar 20, respectively. The "left end" and the "right end" as used herein define the left and right limits to which the slider 30 can be moved.

The display window 10 contains a user-focused picture display area 50 in the central area thereof for displaying a user-focused picture, and a reference picture display area 60 in the upper left corner thereof for displaying a reference picture.

Figure 2:
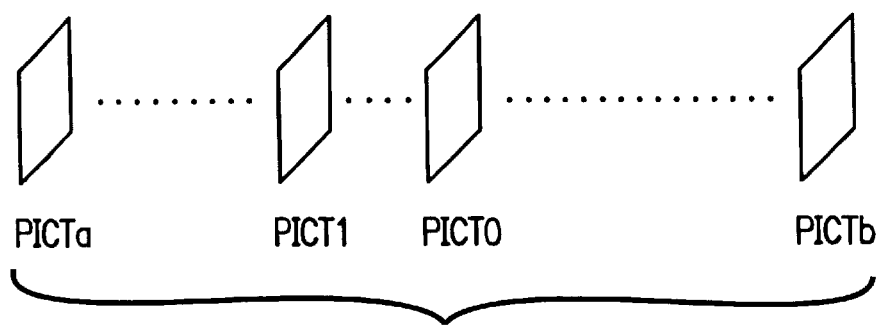
FIG. 2 is a schematic diagram illustrating a plurality of pictures stored in a storage section.

FIG. 2 illustrates a sequence of pictures stored in the storage section 110. Note that FIG. 2 only illustrates some of the stored pictures for the sake of simplicity.

A picture PICTa has a starting label La which is assigned first by the control section 140. A picture PICTb has an end label Lb which is assigned last. A picture PICT0 is a user-focused picture which has a first label L1 corresponding to the position p1 of the slider 30. A picture PICT1 is a reference picture which has a second label L2 corresponding to the position p2 (or p2') of the slider 30.

Figure 3:
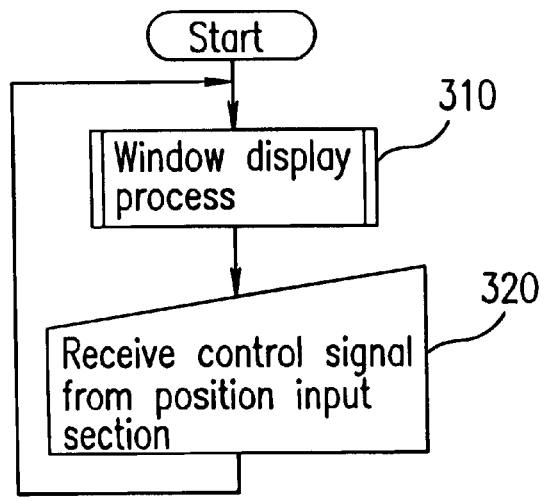
FIG. 3 is a flow chart illustrating a procedure of a picture search process according to Example 1 of the present invention.

FIG. 3 is a flow chart illustrating a procedure of a picture search process performed by the control section 140.

When the picture search process is initiated, the control section 140 performs a window display process in step 310 which includes the displaying of a selected picture in the display window 10 as will be discussed in greater detail below. When the control section 140 receives a control signal from the position input section 130 at step 320, the process returns to step 310 so as to update the window display based on the received control signal.

Figure 4:
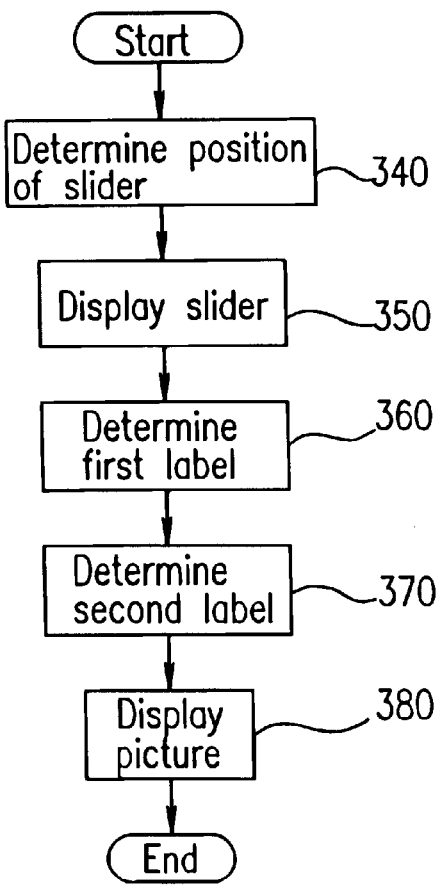
FIG. 4 is a flow chart illustrating a procedure of a picture search process according to Example 1 of the present invention.

FIG. 4 is a flow chart illustrating a procedure of a window display process 310.

The control section 140 determines the position of the slider 30 along the scroll bar 20 based on the control signal from the position input section 130 (step 340). The position p1 of the slider 30 is, for example, a point along the scroll bar 20 specified by the user with the position input section 130. The initial value for the position p1 of the slider 30 may be a value saved from the previous use of the application, or may be any other value including a value such that the left end p2 of the slider 30 is at the left end pa of the scroll bar 20.

When the position p1 of the slider 30 is determined, the control section 140 displays the slider 30 along the scroll bar 20 at the position p1 (step 350). Typically, the slider 30 is centered about the position p1 with a certain length. Herein, the length of the slider 30 represents the proportion of the displayed image with respect to the entire window. For example, in a display window 10c shown in FIG. 6 (described later), where there are five areas 60, 64, 55, 66 and 62, with the total number of pictures being X and the length of the scroll bar being Y, the length of the slider 30c may be Y×5/X.

Then, the control section 140 determines the first label L1 corresponding to the position p1 in the storage section 100 (step 360). The picture having the first label L1 is identified as the user-focused picture PICT0. The determination of the first label L1 corresponding to the position p1 will be described later.

Then, the control section 140 identifies the picture PICT1, which has the second label L2, different from the first label L1, as a reference picture (step 370). Preferably, the second label L2 is determined based on the position p2 at the left end of the slider 30. Alternatively, the second label L2 may be determined based on the position p2' at the right end of the slider 30. The determination of the second label L2 based on the position p2 will be described later.

Finally, the control section 140 displays the reference picture PICT1 in the reference picture display area 60 and the user-focused picture PICT0 in the user-focused picture display area 50 (step 380). The user-focused picture PICT0 is displayed in a way different from the way in which the reference picture PICT1 is displayed (hereinafter, the way in which a picture is displayed will be referred to also as the "display mode").

The display modes of the user-focused picture PICT0 and the reference picture PICTI can be differentiated from each other by, for example, by differentiating the size by which the picture is displayed. In FIG. 1, the user-focused picture display area 50 is provided with an area considerably larger than that of the reference picture display area 60.

Other ways to differentiate the display mode of the user-focused picture PICT0 from that of the reference picture PICT1 may include, for example, framing the user-focused picture PICT0 with a black line or a line of any other color, and/or displaying the user-focused picture PICT0 to be brighter than the reference picture PICT1.

Hereinafter, the determination of a label based on a position along the scroll bar 20 (steps 360 and 370 of FIG. 4) will be described with an example using the position p1 and the first label L1.

The first label L1 corresponds to a relative position of the middle portion p1 of the slider 30 along the total length of the scroll bar 20. For example, assume there are a total of 100 pictures, and the pictures are labelled with successive integers starting from "0" so that the label La corresponding to the left end pa of the scroll bar 20 is "0" while the label Lb corresponding to the right end pb of the scroll bar 20 is "99". If the position p1 of the slider 30 is at a distance equal to about 40% of the total length of the scroll bar 20 from the left end pa thereof, the first label L1 corresponding to the position p1 is "39".

The second label L2 is determined based on the position P2 in a manner similar to the above. In the window 10c of FIG. 6, for example, the position P2 may represent the position of the picture being displayed in the area 60 in the entire sequence of pictures. In the window 10c of FIG. 6, for example, the second label L2 may indicate pictures displayed in the areas 60, 64, 55, 66 and 62. When the second label L2 corresponds to the position P2, five pictures following the picture, which is indicated by the position P2, may be displayed in the areas 60, 64, 55, 66 and 62. When the second label L2 corresponds to the position P2', five pictures following the picture, which is indicated by the position P2', may be displayed in the areas 60, 64, 55, 66 and 62.

While the left end pa corresponds to the label La, which is the first picture, in the present example, it may alternatively correspond to the label Lb, which is the last picture.

As described above, the user can move the slider 30 along the scroll bar 20 by means of a mouse, for example, so as to display the user-focused picture PICT0 and the reference picture PICTI, corresponding to the middle position p1 and the left end p2 (or the right end p2'), in the user-focused picture display area 50 and in the reference picture display area 60, respectively. The user-focused picture PICT0 is emphasized with respect to the reference picture PICT1 by changing the size or the brightness thereof or by framing, thereby allowing the user to visually and easily find the picture of interest.

EXAMPLE 2

Figure 5A:
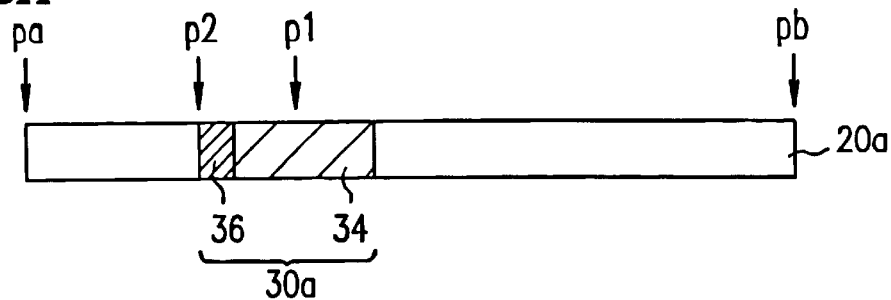
FIGS. 5A and 5B are each a schematic diagram illustrating a scroll bar according to Example 2 of the present invention.
Figure 5B:
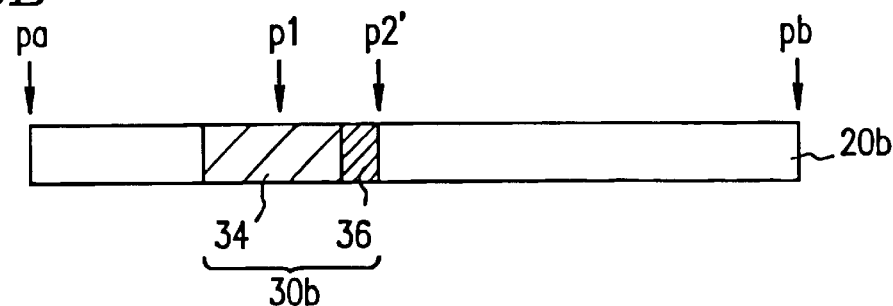

FIGS. 5A and 5B illustrate scroll bars 20*a* and 20*b*, respectively, as would be displayed in the display section 120. Each of the scroll bars 20*a* and 20*b* is identical to the scroll bar 20, illustrated in FIG. 1, except that the slider thereof is different from the slider 30 of Example 1.

The scroll bar 20*a* has a slider 30*a*. The slider 30*a* includes a movement instruction section 34 and an expansion/contraction instruction section 36 which are used to move and adjust the size of the slider 30*a* or 30*b*, respectively. The expansion/contraction instruction section 36 has a predetermined length in the slider 30*a*, and is located on the left end p2 of the slider 30*a*. The length of the expansion/contraction instruction section 36 may be determined based on its proportion to the entire slider 30*a*, or it may be determined based on a fixed number of pixels of the display section 120. In the example illustrated in FIG. 5A, the expansion/contraction instruction section 36 has a length which is about one third of the entire slider 30*a*.

As illustrated in FIG. 5B, the scroll bar 20*b* has a slider 30*b*. The slider 30*b* includes the movement instruction section 34 and the expansion/contraction instruction section 36. The expansion/contraction instruction section 36 has a predetermined length in the slider 30*b*, and is located on the right end p2' of the slider 30*b*.

The scroll bars 20*a* and 20*b* differ from each other only in whether the expansion/contraction instruction section 36 is located at the left end p2 or the right end p2' of the slider. Therefore, the scroll bar 20*a* of FIG. 5A will be described hereinafter, and such description can be similarly applied to the scroll bar 20*b* of FIG. 5B.

Hereinafter, the user's operation for changing the size of the slider 30*a* and the resultant change in the reference picture will be described.

The control section 140 determines the size of the slider 30*a* based on a control signal from the position input section 130. The "size" of the slider 30*a* as used herein is, for example, the horizontal dimension (i.e., the length) of the slider 30*a*. Typically, the user operates the position input section 130 so as to drag to the left or to the right the expansion/contraction instruction section 36, for example. The control section 140 receives a control signal corresponding to the amount of the drag from the position input section 130, and increase or decrease the length of the slider 30*a* based on the control signal, while the position p1 of the slider 30*a* is fixed. Preferably, as the user drags the expansion/contraction instruction section 36, by means of a mouse or the like, away from the middle position p1 of the slider 30*a* (i.e., to the left in FIG. 5A), the length of the slider 30*a* increases symmetrically about the middle position p1. On the other hand, as the user drags the expansion/contraction instruction section 36 toward the middle position p1 of the slider 30*a* (i.e., to the right in FIG. 5A), the length of the slider 30*a* decreases symmetrically about the middle position p1.

When the user drags the movement instruction section 34, rather than the expansion/contraction instruction section 36, the slider 30*a* is moved while the length thereof is fixed.

The control section 140 further determines the second label L2 based on the size of the slider 30*a*. Consequently, by adjusting the size of the slider, a user can customize the display to select a particular picture interval between the user-focused picture and the reference picture.

In the case where the second label L2 is determined to correspond to the left end p2 of the slider 30*a*, for example, as the size (length) of the slider 30*a* changes, the left end position p2 changes with respect to the scroll bar 20*a*. Accordingly, the reference picture PICT1 is switched to another picture which now has the second label L2.

As described above, the user may change the length of the slider 30*a* without moving the position p1 of the slider 30*a* so as to freely change the reference picture PICT1 for the particular user-focused picture PICT0. In particular, when a picture search with a large interval is desired, the user can increase the length of the slider 30*a*, whereby a picture several or many pictures away from the user-focused picture PICT0 is displayed as the reference picture. On the other hand, when a picture search with a small interval is desired, the user can decrease the length of the slider 30*a*, whereby a picture relatively closer to the user-focused picture PICT0 is displayed as the reference picture.

Thus, the user is allowed to freely adjust or narrow the range to be searched, and thus to conduct a picture search in a more intuitive manner.

EXAMPLE 3

Figure 6:
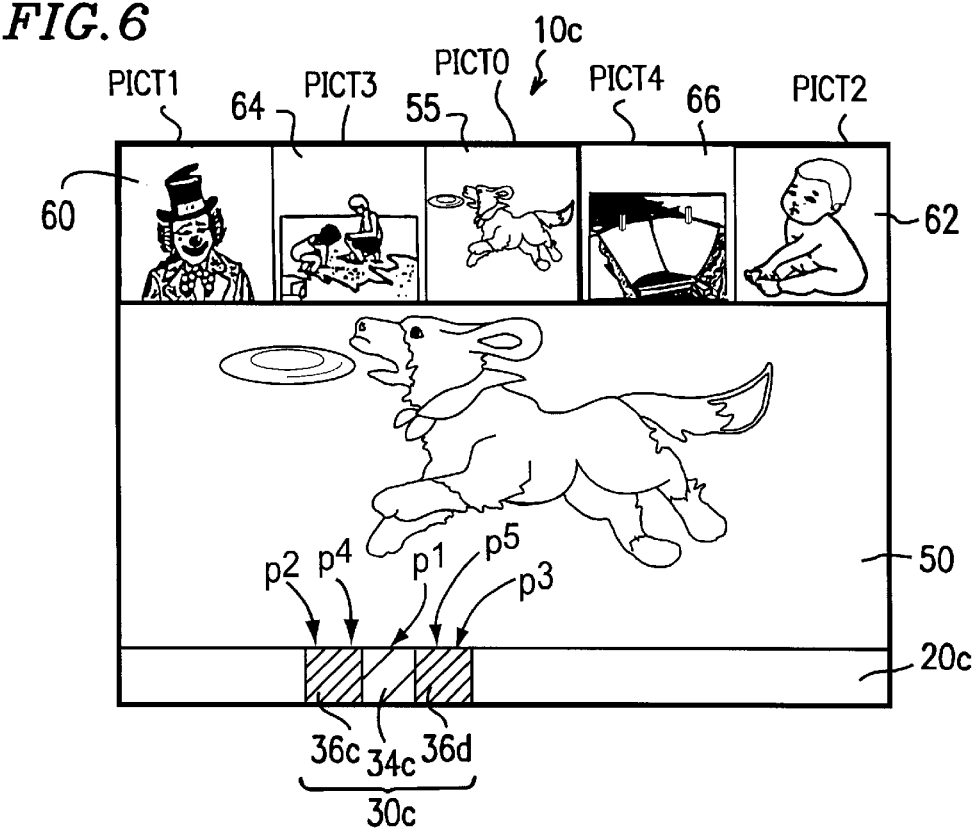
FIG. 6 is a schematic diagram illustrating a display window according to Example 3 of the present invention.

FIG. 6 illustrates a display window 10*c* displayed in the display section 120 according to Example 3 of the present invention.

The display window 10*c* includes five picture display areas arranged along the upper edge of the display window. The five picture display areas are, from the left, the reference picture display area 60, a reference picture display area 64, a user-focused picture display area 55, a reference picture display area 66 and a reference picture display area 62. The display window 10*c* further includes the user-focused picture display area 50 in a central area of the display window.

The first, second, third and fourth reference pictures PICT1, PICT2, PICT3 and PICT4 are displayed in the reference picture display areas 60, 62, 64 and 66, respectively.

The user-focused picture PICT0 is displayed in the two user-focused picture display areas 50 and 55. The user-focused picture PICT0 is displayed in the area 50 in a display mode different from that for the reference pictures in the areas 60, 62, 64 and 66. The user-focused picture PICTO is also displayed in the area 55 in the same display mode as that for the reference pictures in the areas 60, 62, 64 and 66.

The display modes can differ from each other by, for example, changing the size to which the picture is displayed. In FIG. 6, the user-focused picture display area 50 is provided with an area considerably larger than that of the reference picture display area 60, or the like. Other ways to differentiate the display modes may include, for example, framing the user-focused picture PICT0 with a black line or a line of any another color, and displaying the user-focused picture PICT0 to be brighter than the reference picture PICT1.

It is noted that the user-focused picture display area 55 is optional.

The scroll bar 20c extends along the lower edge of the display window 10c. The scroll bar 20c has a slider 30c. The slider 30c has five positions p1 to p5, respectively, corresponding to the above-described five picture display areas. The position p1 corresponds to the user-focused picture PICTO. The positions p2, p3, p4 and p5 correspond to the first, second, third and fourth reference pictures PICT1, PICT2, PICT3 and PICT4, respectively.

Preferably, the position p1 corresponds to the middle position of the slider 30c, the position p2 corresponds to the left end of the slider 30c, the position p3 corresponds to the right end of the slider 30c, the position p4 is between the positions p1 and p2 at a position which bisects p1 and p2, and the position p5 is between the positions p1 and p3 at a position which bisects p1 and p3.

The slider 30c includes a movement instruction section 34c for designating the position of, or moving, the slider 30c and two expansion/contraction instruction sections 36c and 36d for increasing or decreasing the length of the slider 30c. The movement instruction section 34c is defined by a predetermined length so as to include the position p1. Preferably, the movement instruction section 34c is centered about the position p1 and has a length which is about one third of the entire slider 30c. The expansion/contraction section 36c is located on the left of the movement instruction section 34c, and preferably has a length which is about one third of the entire slider 30c. The expansion/contraction section 36d is located on the right of the movement instruction section 34c, and preferably has a length which is about one third of the entire slider 30c.

As in Example 2, the user can drag the movement instruction section 34c by means of the position input section 130, such as a mouse, thereby moving the slider 30c along the scroll bar 20c. Moreover, as in Example 2, the user can drag to the left or to the right the expansion/contraction section 36c or 36d, by means of the position input section 130, so as to increase or decrease the length of the slider 30c. During this operation, the position p1 of the slider 30c is fixed, while only the length of the slider 30c is increased or decreased about the position p1 in accordance with the amount of the drag. Typically, as in Example 2, when the expansion/contraction section 36c or 36d is dragged away from the middle position p1 of the slider 30c (i.e., 36c to the left or 36d to the right in FIG. 6), the length of the slider 30c increases. On the other hand, when the expansion/contraction section 36c or 36d is dragged toward the middle position p1 of the slider 30c (i.e., 36c to the right or 36d to the left in FIG. 6), the length of the slider 30c decreases.

Thus, as the length of the slider 30c is increased or decreased, the positions p2 to p5 move respectively.

There are provided five labels L1 to L5 respectively corresponding to the five positions p1 to p5 in a manner similar to those of the above-described examples. Moreover, the five pictures PICT0 to PICT4 having these labels respectively correspond to the labels L1 to L5.

Finally, the control section 140 displays the user-focused picture PICT0 in the user-focused picture display areas 50 and 55 in the display window 10c, and displays the four reference pictures PICT1, PICT2, PICT3 and PICT4 in the four reference picture display areas 60, 62, 64 and 66, respectively. As described above, the user-focused picture PICT0 is displayed in the area 50 in a display mode different from that for the reference pictures in the areas 60, 62, 64 and 66. The user-focused picture PICT0 is also displayed in the area 55 in the same display mode as that for the reference pictures in the areas 60, 62, 64 and 66.

Thus, as the length of the slider 30c is increased or decreased, the four positions p2 to p5, move respectively, thereby changing the labels L2 to L5 accordingly which respectively correspond to the four positions p2 to p5. As the labels L2 to L5 are changed, the four reference pictures PICT1 to PICT4 change accordingly.

Figure 7:
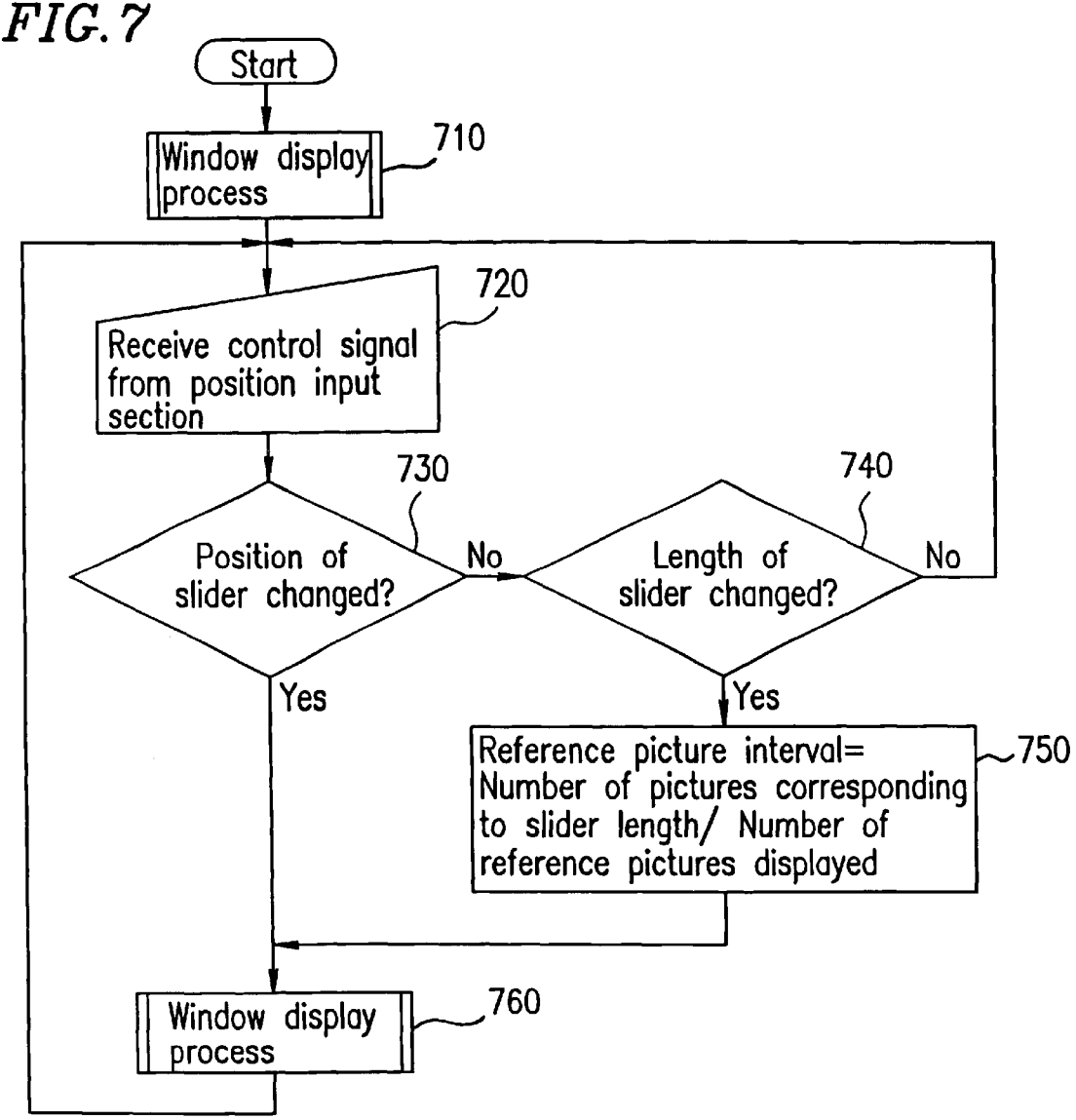
FIG. 7 is a flow chart illustrating a procedure of a picture search process according to Example 3 of the present invention.

FIG. 7 illustrates a procedure of a picture search process performed by the control section 140.

When the picture search process is initiated, the position input section 130 first performs a window display process (step 710). Then, when the control section 140 receives a control signal from the position input section 130 (step 720), it is determined whether the slider 30c has moved (step 730). If the position has changed (yes), the process proceeds to step 760 so as to perform the window display process in accordance with the new position of the slider 30c. If the position of the slider 30c has not changed (no), the process proceeds to step 740 so as to determine whether the length of the slider 30c has been changed.

If the determination in step 740 is negative (no), neither the position nor the length of the slider 30c has changed. In such a case, the display window 10c remains unchanged. If the determination in step 740 is affirmative (yes), a new reference picture interval is then calculated (step 750). The term "reference picture interval" as used herein refers to an interval between two displayed reference pictures, and thus corresponds to the number of pictures which are not displayed and which exist between the two displayed reference pictures. This value can be calculated as the number of pictures corresponding to the length of the slider 30c divided by the number of reference pictures to be displayed in the display window. For example, when 100 pictures correspond to the length of the slider 30c and four reference pictures are displayed, then the reference picture interval is 25.

When the display interval is determined in step 750, the window display process corresponding to the new display interval is performed at step 760.

Figure 8:
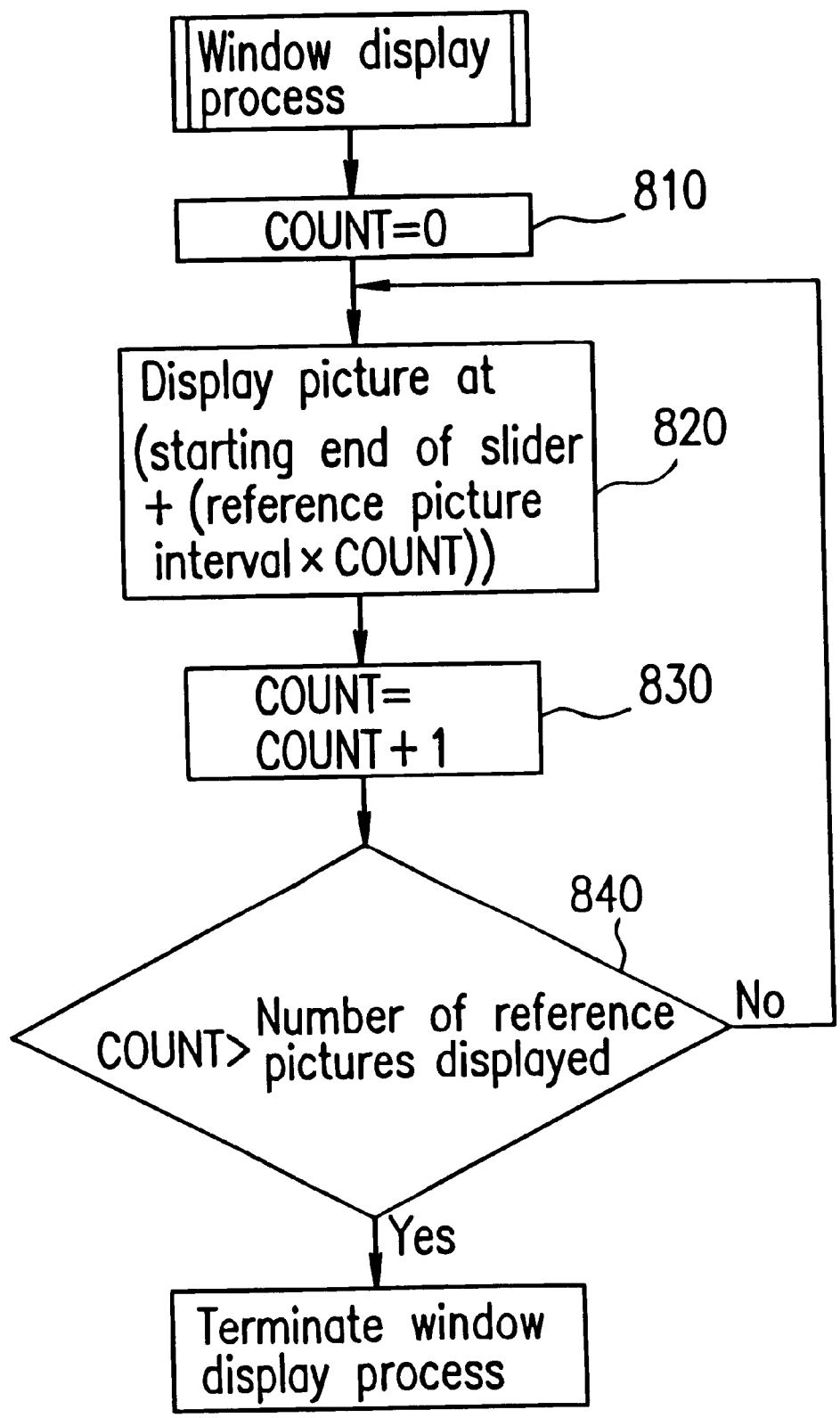
FIG. 8 is a flow chart illustrating a procedure of a picture search process according to Example 3 of the present invention.

FIG. 8 is a flow chart illustrating a window display process procedure performed by the control section 140. When the picture display process is initiated, the task variable "COUNT" is first reset to "0" (step 810). Then, a picture corresponding to the position of the slider 30c is selected and displayed (step 820). More specifically, a picture which corresponds to the starting end (the left end) of the slider 30c plus the value (reference picture interval x COUNT) is selected and displayed in the display window 10c.

Then, the variable COUNT is incremented (step 830). If the value COUNT is greater than the number of reference pictures displayed, the window display process is terminated. Otherwise the process returns to step 820 sodas to repeat the above-described process (step 840).

As described above, by displaying many reference pictures while allowing the user to freely change the display interval between two reference pictures, the user is allowed to find a picture of interest in a more intuitive manner.

Although four reference pictures PICTI to PICT4 are displayed in the present example, the reference pictures PICT3 and PICT4 may be omitted. Conversely, instead of the bisectional positions p4 and p5, it is also possible to provide two trisectional positions between the positions p1 and p2 and between the positions p1 and p3, thereby displaying six reference pictures.

EXAMPLE 4

Figure 9:
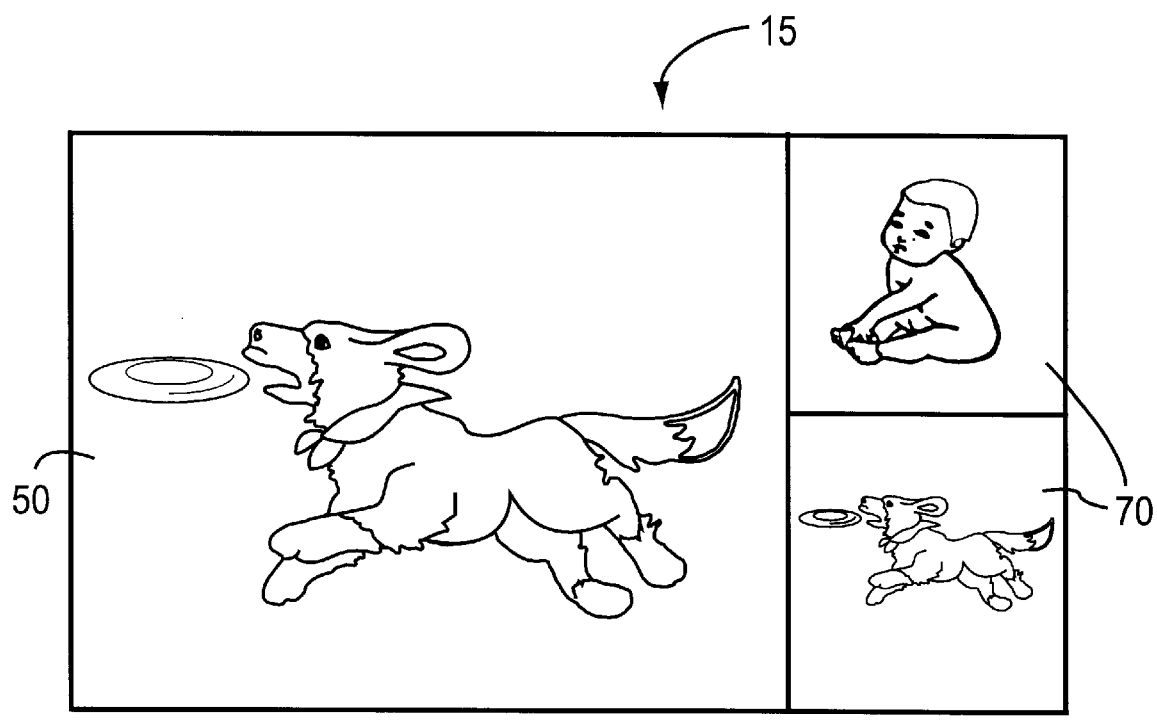
FIG. 9 is a schematic diagram illustrating a display window according to Example 4 of the present invention.

FIG. 9 illustrates a display window 15 according to Example 4 of the present invention.

The display window 15 includes the user-focused picture display area 50 and one or more preferential picture presenting areas 70.

In the present example, the pictures stored in the storage section 110 have respective values. The control section 140 determines the value of the picture displayed in the display window 15 in accordance with a predetermined function.

The predetermined function may be, for example, a function of a time period for which the picture has been displayed in the display window 15. Preferably, the time function is an accumulated time period for which the picture has been displayed in the display window 15. More preferably, the display time accumulation is conducted only for the user-focused picture being displayed in the user-focused picture display area 50. Still more preferably, when a single display time period exceeds a predetermined upper limit value, the display time period is considered to be the upper limit value.

The predetermined function does not have to be the accumulated time period for which the picture has been displayed, but may also be an accumulated number of times the picture has been displayed. Preferably, the predetermined function is a function of both the display time period and the number of times of display. More preferably, a standard deviation is calculated using both the display time period and the number of times of display. This preferred predetermined function will be described later in detail.

The picture for which the value calculated as described above exceeds a predetermined value is displayed, preferably while being shrunk, in the preferential picture presenting area 70 in the display window 15. Alternatively, each picture may be provided with a preferential order based on the above-described value, so that a picture whose preferential order is less (or greater) than or equal to a predetermined value is displayed in the preferential picture presenting area 70.

Thus, a picture which is often viewed by the user can be preferentially displayed in a particular area in the display window.

Figure 10:
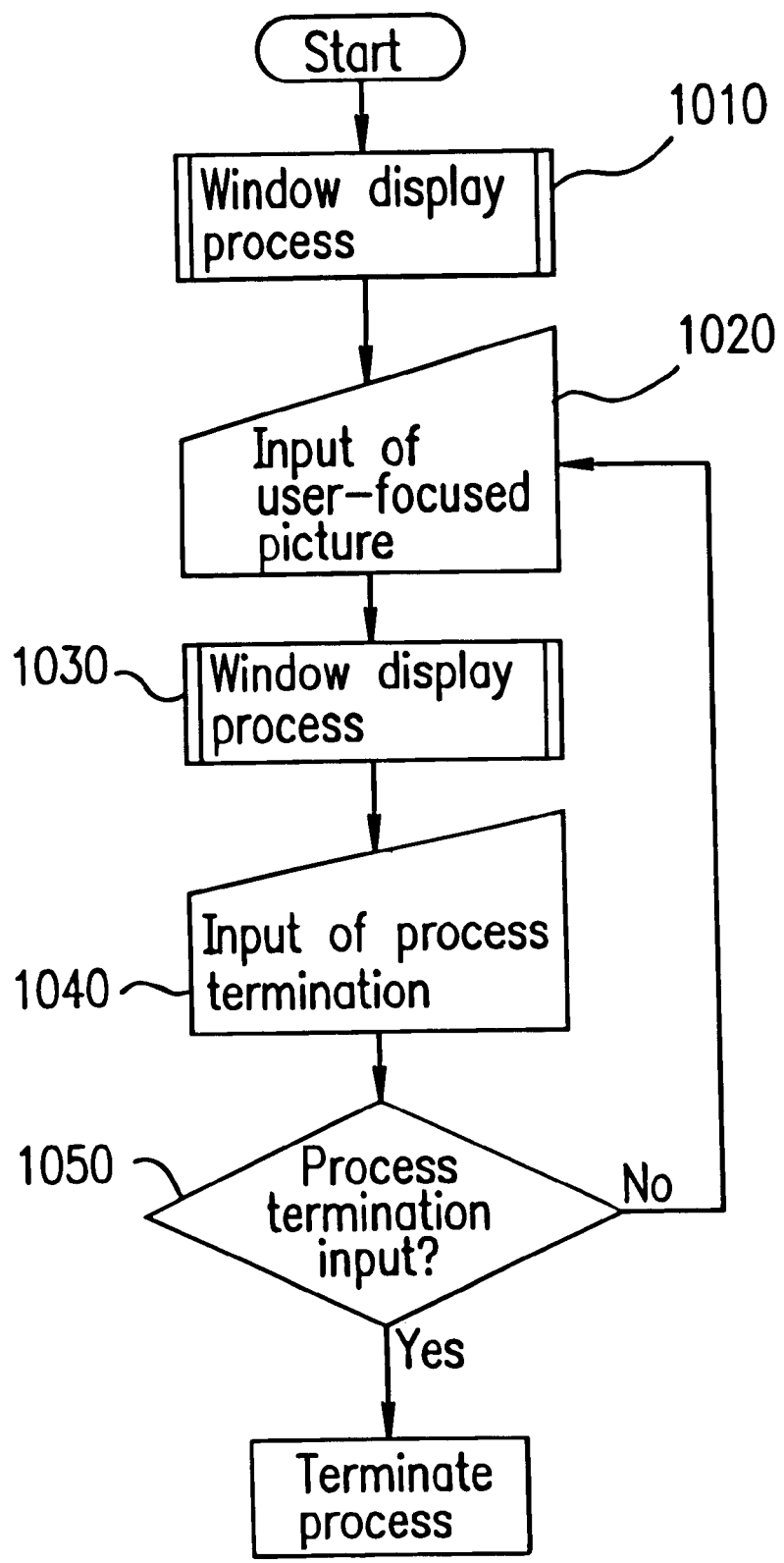
FIG. 10 is a flow chart illustrating a procedure of a picture search process according to Example 4 of the present invention.

FIG. 10 is a flow chart illustrating a procedure of a picture search process, which is performed by the control section 140.

When the picture search process is initiated, a picture display process is first performed (step 1010). Then, when a new user-focused picture is selected (step 1020), a picture display process for the new user-focused picture is performed (step 1030). Finally, when it is determined (step 1050) that the process termination request is input (step 1040), the process is terminated.

Figure 11:
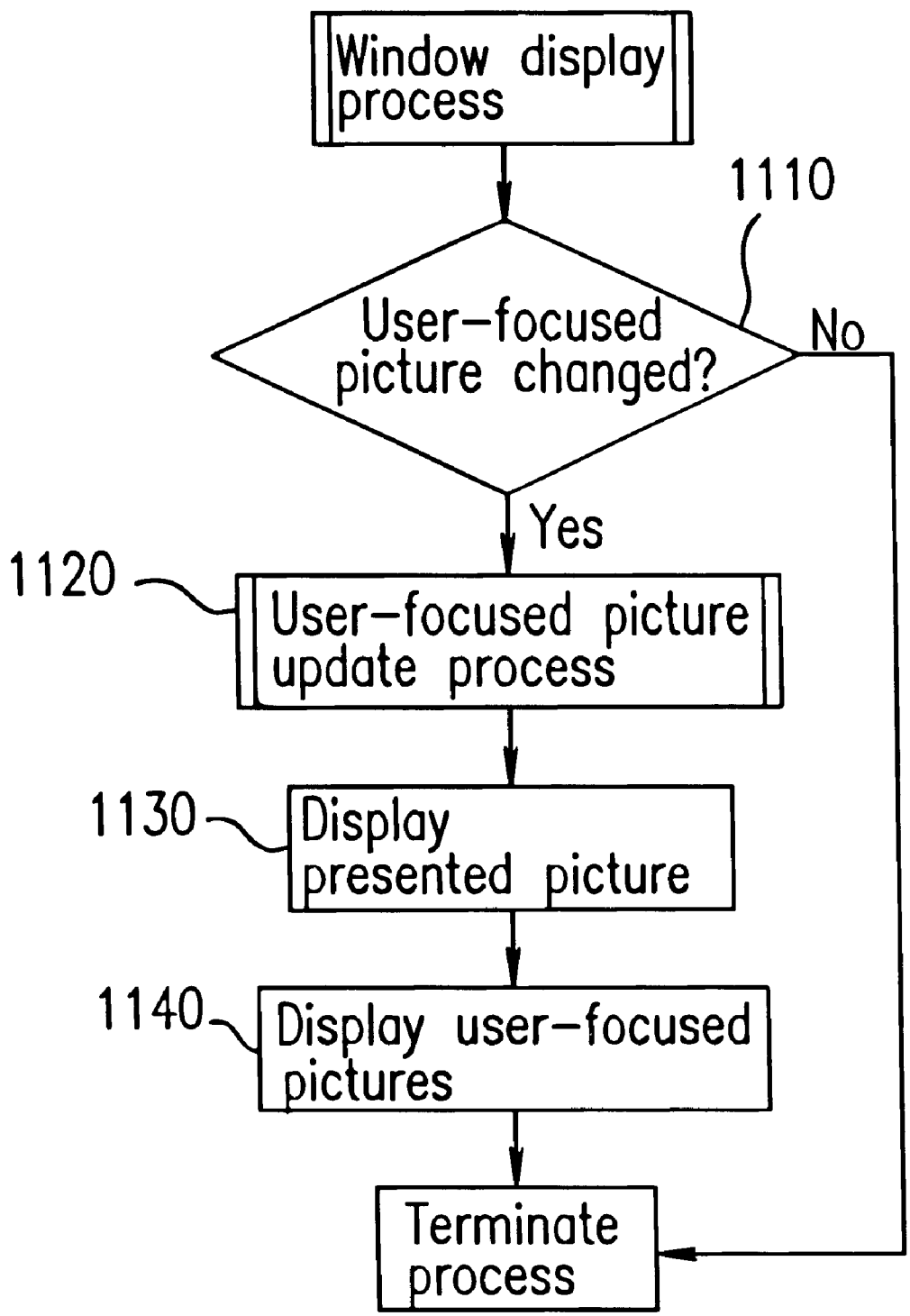
FIG. 11 is a flow chart illustrating a procedure of a picture search process according to Example 4 of the present invention.

FIG. 11 is a flow chart illustrating a picture display process at step 1010, which is performed by the control section 140.

First, it is determined whether the user-focused picture has been changed (step 1110). This is done by determining whether the label of the user-focused picture has been changed. If a change has occurred (yes), the process proceeds to a user-focused picture update process (step 1120). Otherwise (no), the process is terminated. When the user-focused picture update process is completed, a presented picture display process is then performed (step 1130). In the presented picture display process, the picture, which is determined to be added as a new picture to be presented in the user-focused picture update process, is displayed in the preferential picture presenting area. Finally, the user-focused picture is displayed (step 1140).

Figure 12:
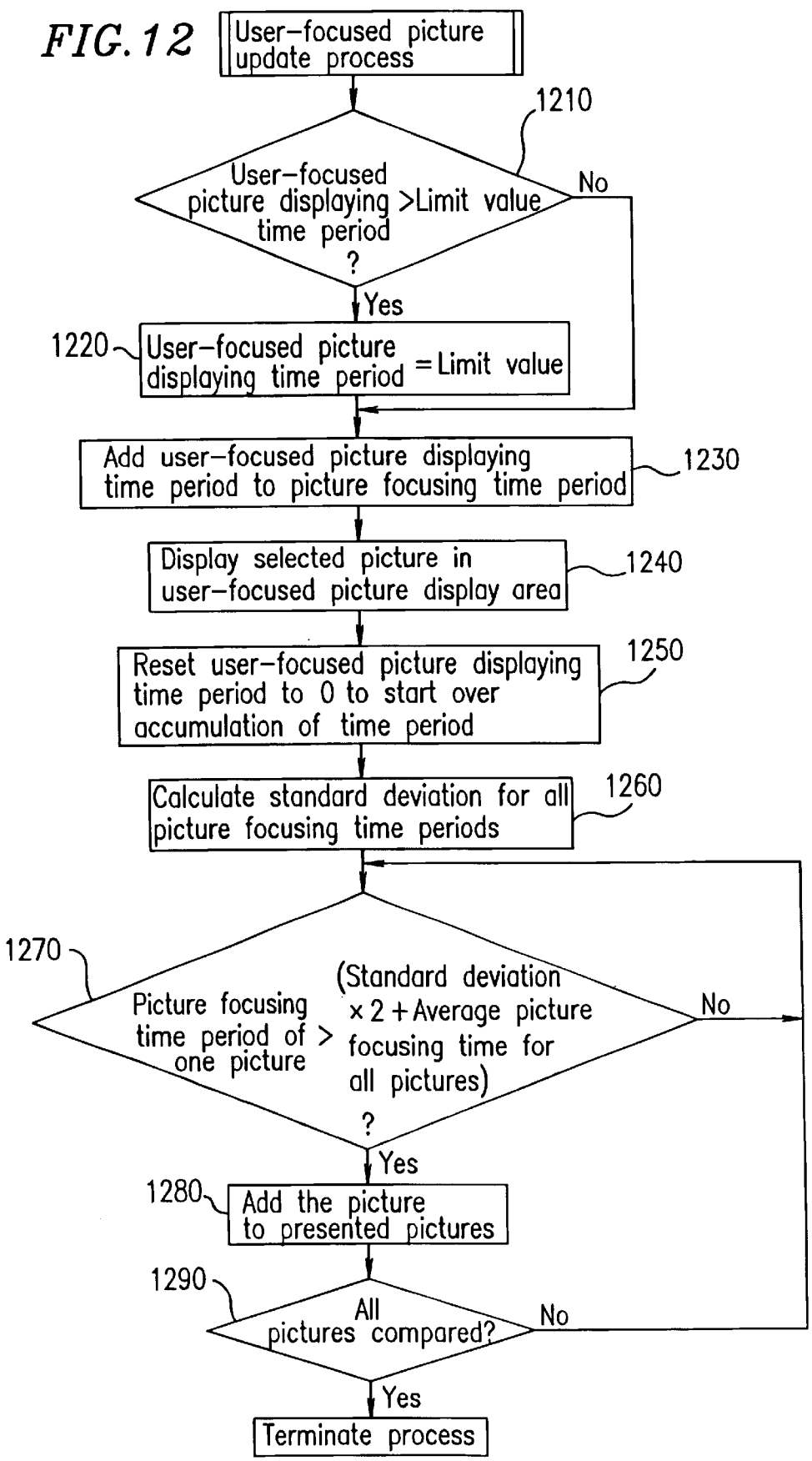
FIG. 12 is a flow chart illustrating a procedure of a picture search process according to Example 4 of the present invention.

FIG. 12 is a flow chart illustrating the user-focused picture update process at step 1120, which is performed by the control section 140.

First, it is determined whether the time period for which the user-focused picture has been displayed is greater than a predetermined value (step 1210). The predetermined value is preferably about 5 to about 20 minutes, and more preferably about 10 minutes. When the display time period of the user-focused picture is equal to or less than the predetermined value (no), the process proceeds to step 1230. When the display time period of the user-focused picture is greater than the predetermined value (yes), the display time period is set to the predetermined value (step 1220). After the display time period is set, the display time period is added to the picture focusing time period (i.e., a time period for which the picture has been viewed) (step 1230). The picture focusing time period is an accumulated display time period of the picture and is provided for each a picture. Then, the user-focused picture is displayed in a user-focused picture display area (step 1240).

The display time period is reset to "0", so as to start over the accumulation of the display time period (step 1250). Then, a standard deviation is calculated for all of the picture focusing time periods (step 1260). Thereafter, it is determined whether the picture focusing time period of a particular picture is greater than the predetermined value (the standard deviation×2+the average of the picture focusing time periods for all pictures) (step 1270). If yes, the picture is added to the preferential picture presenting area (step 1280). Then, it is determined whether such a comparison has been done for all of the pictures (step 1290). If yes, the user-focused picture update process is terminated. Otherwise, the process returns to step 1270 for comparison of the next picture. If the determination at step 1270 is negative, step 1270 is repeated for the next picture.

By such a process, it is possible to automatically select a picture which is viewed often by the user and to present the picture in a particular area, so as to facilitate the finding of a picture the user wishes to view.

According to the present invention, the user can move the slider along the scroll bar to change the user-focused picture and the reference picture. Moreover, there is provided a picture search device which displays the user-focused picture in a display mode different from that for the reference picture, whereby it is possible to visually find a picture of interest in an intuitive manner.

Furthermore, according to the present invention, there is provided a picture search device which automatically gives a high preferential order to a picture which is often viewed by the user with preference, whereby it is possible to visually find the picture preferred by the user in an intuitive manner.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A picture search device, comprising: a storage section; a display section; a position input section; and a control section for controlling the storage section, the display section and the position input section, wherein:

the storage section contains a plurality of pictures respectively provided with labels which are assigned in accordance with a predetermined rule;

the position input section detects input information from a user so as to provide a control signal to the control section in response to the input information; and the control section displays a scroll bar including a slider in a predetermined area in the display section, determines a position along the scroll bar at which the slider is to be displayed based on the control signal, displays the slider at the position in the display section, determines one of the plurality of labels corresponding to the position as a first label, identifies one of the pictures having the first label as a user-focused picture, identifies one of the pictures having a second label, different from the first label, as a reference picture, displays the reference picture in the display section, and displays the user-focused picture in a display mode different from a display mode of the reference picture.

2. A picture search device according to claim 1, wherein the control section further determines a size of the slider based on the control signal from the position input section, displays the slider at the position in the display section according to the size, and determines the second label based on the size.

3. A picture search device according to claim 1, wherein the control section further determines a size of the slider based on the control signal from the position input section, displays the slider at the position in the display section according to the size, and determines the second label based on the size of the slider, and wherein the control section further determines a third label, different from the second label, based on the size of the slider, identifies one of the pictures having the third label as a second reference picture, and displays the second reference picture in the display section.

4. A picture search device according to claim 3, wherein the reference picture and the second reference picture are displayed along an edge of the display section, with a copy of the user-focused picture displayed between the reference picture and the second reference picture in a same display mode as that for the reference picture.

5. A picture search device according to claim 4, wherein the control section identifies one of the pictures having a fourth label as a third reference picture and one of the pictures having a fifth label as a fourth reference picture, so as to further display the third and fourth reference pictures in the display section; and the fourth label is assigned between the first and second labels, while the fifth label is assigned between the first and third labels.

6. A picture search device according to claim 1, wherein the predetermined rule for assigning the labels is a function of time.

7. A picture search device according to claim 1, wherein the predetermined rule for assigning the labels is a spatial function.

8. A picture search device according to claim 1, wherein the mode for displaying the user-focused picture which is different from that for the reference picture comprises displaying the user-focused picture in a larger display area than that for the reference picture.

9. The picture search device of claim 1, wherein the control section determines the first label based upon the location of a first portion of the slider, and determines the second label based upon a location of a second portion of the slider different from the first portion, and wherein the reference picture is displayed in the display section at the same time the user-focused picture is being displayed.

10. A picture search device, comprising: a storage section; a display section; and a control section for controlling the storage section and the display section, wherein:

the storage section contains a plurality of pictures respectively provided with labels which are assigned in accordance with a predetermined rule, the pictures having respective values; and the control section determines the value of the picture displayed in the display section in accordance with a predetermined function, and provides a preferential order to each of the plurality of pictures stored in the storage section based on the determined value.

11. A picture search device according to claim 10, wherein the predetermined function for determining the value includes a function where the value is increased in accordance with at least one of a time period for which the picture has been displayed in the display section and a number of times the picture has been displayed in the display section.

12. A picture search device according to claim 11, wherein when a display time period for which the picture has been displayed in a single time exceeds a predetermined upper limit value, the display time period is considered to be the upper limit value.

13. A picture search device according to claim 10, wherein:

the display section has a user-focused picture display area; and the predetermined function for determining the value includes a function where the value is increased in accordance with at least one of a time period for which the picture has been displayed in the user-focused picture display area and a number of times the picture has been displayed in the user-focused picture display area.

14. A picture search device according to claim 13, wherein when a display time period for which the picture has been displayed in a single time exceeds a predetermined upper limit value, the display time period is considered to be the upper limit value.

15. A picture search device according to claim 10, wherein the predetermined function for determining the value includes a function where the value is changed in accordance with a display area of the picture.

16. A picture search device according to claim 10, wherein the preferential order of the picture is determined using a standard deviation of a frequency distribution for the values of the pictures.

17. A picture search device according to claim 10, wherein at least one of the pictures whose preferential order is less than or equal to a predetermined value is stored in a predetermined storage location.

18. A recording medium storing a program and readable for a picture search device, the device comprising: a storage section; a display section; a position input section; and a control section for controlling the storage section, the display section and the position input section, the storage section containing a plurality of pictures respectively provided with labels which are assigned in accordance with a predetermined rule, and the position input section detecting input information from a user so as to provide a control signal to the control section in response to the input information, wherein the program comprises:

displaying a scroll bar including a slider in a predetermined area in the display section;

determining a position along the scroll bar at which the slider is to be displayed based on the control signal;

displaying the slider at the position in the display section;

determining one of the plurality of labels corresponding to the position as a first label;

identifying one of the pictures having the first label as a user-focused picture;

identifying one of the pictures having a second label, different from the first label, as a reference picture;

displaying the reference picture in the display section; and displaying the user-focused picture in a display mode different from a display mode of the reference picture.

19. The device of claim 18, wherein the program comprises identifying the second label, different from the first label, as the reference picture based upon a location of a portion of the slider.

20. A recording medium storing a program and readable for a picture search device, the device comprising: a storage section; a display section; and a control section for controlling the storage section and the display section, the storage section containing a plurality of pictures respectively provided with labels which are assigned in accordance with a predetermined rule, and the pictures having respective values, wherein the program comprises the steps of:

determining the value of the picture displayed in the display section in accordance with a predetermined function; and providing a preferential order to each of the plurality of pictures stored in the storage section based on the determined value.

21. A picture search device, comprising: a storage section; a display section; a position input section; and a control section for controlling the storage section, the display section and the position input section, wherein:

the storage section contains a plurality of pictures respectively provided with labels which are assigned in accordance with a predetermined rule;

the position input section detects input information from a user so as to provide a control signal to the control section in response to the input information; and the control section displays a scroll bar including a slider in a predetermined area in the display section, determines a position along the scroll bar at which the slider is to be displayed based on the control signal, displays the slider at the position in the display section, determines one of the plurality of labels corresponding to the position of a portion of the slider as a first label, identifies one of the pictures having the first label as a user-focused picture, identifies one of the pictures having a second label, different from the first label, as a reference picture based upon a location of another portion of the slider, and wherein the reference picture is displayed in the display section at the same time the user-focused picture is being displayed, and the user-focused picture is displayed in a display mode different from a display mode of the reference picture.

* * * * *